(12) United States Patent
Duckheim et al.

(10) Patent No.: US 11,586,190 B2
(45) Date of Patent: Feb. 21, 2023

(54) METHOD FOR OPERATING A TECHNICAL OR NON-TECHNICAL SYSTEM, AND FACILITY FOR SUCH SYSTEMS

(71) Applicant: SIEMENS AKTIENGESELLSCHAFT, Munich (DE)

(72) Inventors: Mathias Duckheim, Erlangen (DE); Wiebke Froehner, Amberg (DE); Thomas Werner, Rednitzhembach (DE)

(73) Assignee: Siemens Aktiengesellschaft, Munich (DE)

( * ) Notice: Subject to any disclaimer, the term of this patent is extended or adjusted under 35 U.S.C. 154(b) by 136 days.

(21) Appl. No.: 16/939,386

(22) Filed: Jul. 27, 2020

(65) Prior Publication Data

US 2021/0026342 A1  Jan. 28, 2021

(30) Foreign Application Priority Data

Jul. 25, 2019 (EP) .................................. 19188302

(51) Int. Cl.
*G05B 23/02* (2006.01)
*G06F 21/55* (2013.01)

(52) U.S. Cl.
CPC ..... *G05B 23/0254* (2013.01); *G05B 23/0275* (2013.01); *G05B 23/0283* (2013.01); *G06F 21/554* (2013.01)

(58) Field of Classification Search
CPC ............ G05B 23/0254; G05B 23/0275; G05B 23/0283; G05B 19/0428; G06F 21/554;
(Continued)

(56) References Cited

U.S. PATENT DOCUMENTS 9,674,207 B2 *  6/2017  Di Pietro ............ H04L 63/1458
10,505,955 B2 * 12/2019  Mestha ..................... G06K 9/62
(Continued)

FOREIGN PATENT DOCUMENTS

| CN | 104573510 A | 4/2015 |
| CN | 109818349 A | 5/2019 |

(Continued)

OTHER PUBLICATIONS

Christian et al. "LV-grid automation system—A technology review", 2014 IEEE PES General Meeting Conference & Exposition, IEEE, Jul. 27, 2014 (Jul. 27, 2014), pp. 1-5 (Year: 2014).*
(Continued)

*Primary Examiner* — Mohammad K Islam
(74) *Attorney, Agent, or Firm* — Laurence A. Greenberg; Werner H. Stemer; Ralph E. Locher

(57) ABSTRACT

A method operates a technical or non-technical system. At least one information element of a first type which relates to the system and is dependent on the respective system state of the system is transmitted according to the method from at least one first facility of the system to at least one second facility. The second facility uses at least one information element of a second type which originates neither from the first facility nor from a different facility of the system, i.e. it comes from a source other than the system, to estimate the system state, checks, on the basis of the estimated system state, whether the received information matches the estimated system state to a predefined extent, and, in the event of a match to the predefined extent, regards the information as trusted, and otherwise generates a warning signal indicating a possible data attack.

14 Claims, 3 Drawing Sheets

Figure 1:
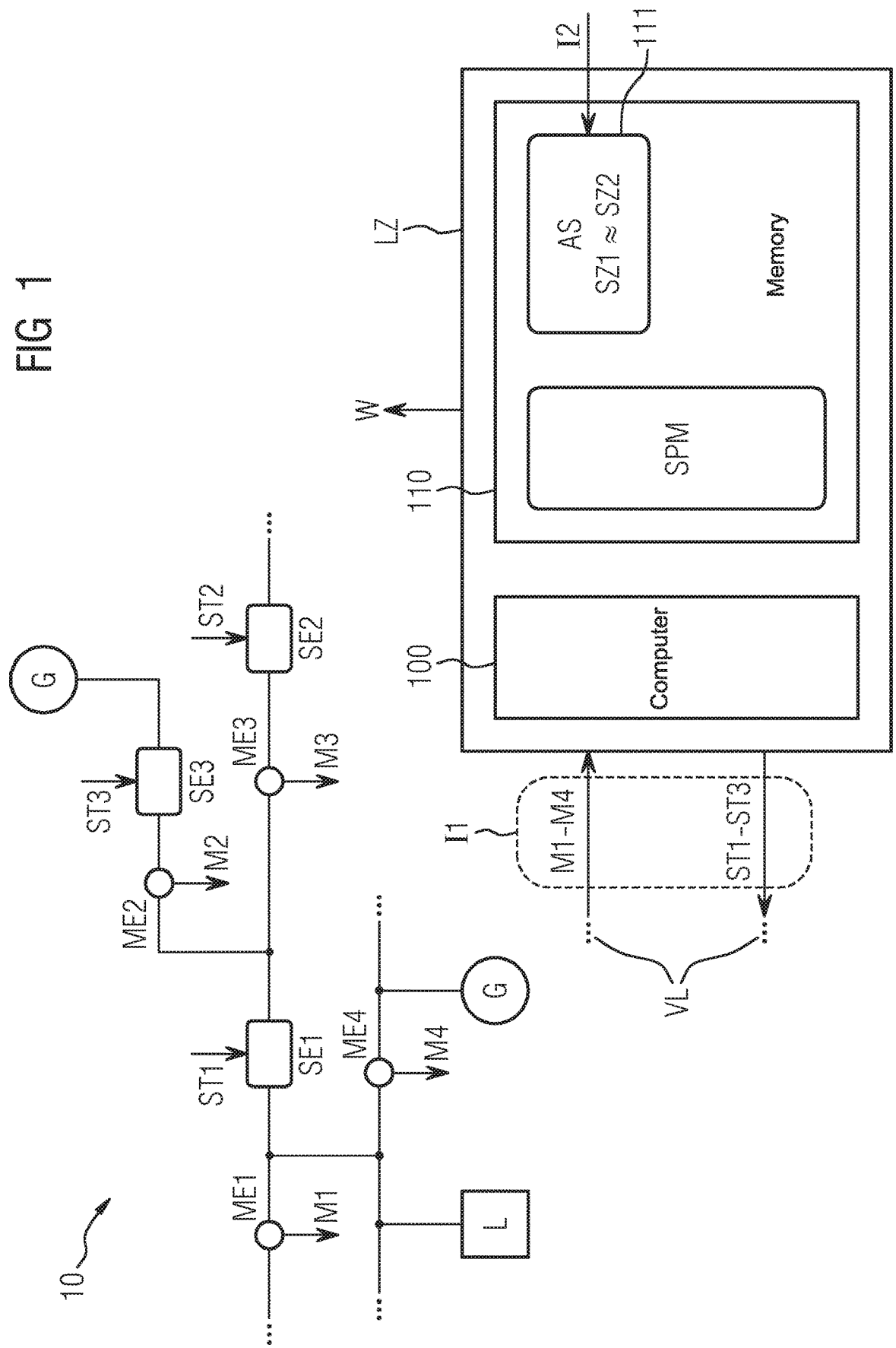

(58) Field of Classification Search
CPC .... H02J 4/00; H02J 2310/12; H02J 13/00002; H04L 63/1408
See application file for complete search history.

(56) References Cited

U.S. PATENT DOCUMENTS

| | | | |
|---|---|---|---|
| 10,671,060 B2* | 6/2020 | Abbaszadeh | H04L 63/1408 |
| 2018/0260561 A1* | 9/2018 | Mestha | G06F 21/554 |
| 2020/0110881 A1* | 4/2020 | Achanta | G06F 21/577 |
| 2020/0356668 A1* | 11/2020 | Hart | G01D 3/032 |

FOREIGN PATENT DOCUMENTS

| | | |
|---|---|---|
| DE | 10248100 A1 | 4/2004 |
| GB | 2558534 A | 7/2018 |

OTHER PUBLICATIONS

Ashrafuzzaman M. et al.: "Detecting Stealthy False Data Injection Attacks in Power Grids Using Deep Learning" 2018, 14th International Wireless Communications & Mobile Computing Conference (IWCMC).

Youssef et al: "False Data Injection Attacks Against State Estimation in Smart Grids: Challenges and Opportunities", 2018 IEEE Canadian Conference on Electrical & Computer Engineering (CCECE), pp. 1-5, XP033395149, DOI: 10.1109/CCECE.2018.8447683, [found on Aug. 27, 2018].

Esmalifalak M. et al: "Detecting Stealthy False Data Injection Using Machine Learning in Smart Grid", IEEE Systems Journal, vol. 11, No. 3, Sep. 2017, pp. 1644-1652, XP011661186, ISSN: 1932-8184, DOI: 10.1109/JSYST.2014.2341597, [found on Sep. 27, 2017].

Deng, R. et al.: "False Data Injection Attacks Against State Estimation in Power Distribution Systems", 2018, IEEE Transactions on Smart Grid vol. PP Issue 99 pp. 1-1.1.

Li, Q. et al.: "Data-Driven False Data Injection Attacks on State Estimation in Smart Grid", 37th Chinese Control Conference (CCC), Jul. 25-27, 2018, pp. 6190-6195.

Liu X. et al.: "Local Topology Attacks in Smart Grids", IEEE Transactions on Smart Grid, vol. 8, No. 6, Nov. 2017, pp. 2617-2626.

Kim, J. et al.: "On Topology Attack of a Smart Grid: Undetectable Attacks and Countermeasures" IEEE Journal on Selected Areas in Communications vol. 31, No. 7, Jul. 2013, pp. 1294-1305.

Oerter C. et al: "LV-Grid Automation System—A Technoloyy Review", 2014 IEEE PES General Meeting I Conference & Exposition, IEEE, pp. 1-5, XP032670577, DOI: 10.1109/PESGM.2014.6939827, [found on Oct. 29, 2014].

* cited by examiner

METHOD FOR OPERATING A TECHNICAL OR NON-TECHNICAL SYSTEM, AND FACILITY FOR SUCH SYSTEMS

CROSS-REFERENCE TO RELATED APPLICATION

This application claims the priority, under 35 U.S.C. § 119, of European patent application EP 19188302, filed Jul. 25, 2019; the prior application is herewith incorporated by reference in its entirety.

BACKGROUND OF THE INVENTION

Field of the Invention

The invention relates to a method for operating a technical or non-technical system, wherein at least one information element of a first type which relates to the system and is dependent on the respective system state of the system is transmitted according to the method from at least one first facility of the system to at least one second facility.

Increasing numbers of solutions are employed today to manage technical systems, wherein central IT systems receive information from devices via private and public communication networks. The central systems capture this information, process it and, where appropriate, transmit new information back to the devices. For the tasks of the central IT systems, it is very important that these data are not manipulated by third parties. False data can result in incorrect responses from the central IT system which compromise the functional capability and security of the technical or non-technical system.

Third parties can effect manipulations of the data e.g. via "man-in-the-middle" attacks in which the attacker inserts himself between the central IT system and the devices. The attacker masquerades as the central IT system in relation to the devices, and as a device in relation to the central IT system. The attacker falsifies the information stream between the devices and the central IT system with false data (known as ""False Data Injection Attacks" (FDIA)).

The operators of these IT systems put a number of safeguards in place to counter this threat. They essentially focus on preventing these attacks. However, the most recent examples show that such attacks can never be totally prevented.

Central IT systems therefore have checking mechanisms with which errored input information can be detected. However, the most recent publications show that the known methods do not offer comprehensive security. Even without complete knowledge of the data model and the relationships of the technical system, attacks can be designed in such a way that errored information is not always noticed.

Particularly in the case of Internet of Things (IOT) systems, attacks are conceivable in which, in response to a command, the participating devices are caused to transmit information which they have collected at a defined time in the past, rather than the current values, to the central IT system. The portrayal of the process to the central IT system would therefore initially be plausible and consistent, even if it does not match the current process state.

The following publications can be cited as examples of relevant literature on the subject of "False Data Injection":
[1] Ashrafuzzaman, Mohammad; Chakhchoukh, Yacine; Jillepalli, Ananth A.; Tosic, Predrag T.; de Leon, Daniel Conte; Sheldon, Frederick T.; Johnson, Brian K. Detecting Stealthy False Data Injection Attacks in Power Grids Using Deep Learning 2018 14th International Wireless Communications & Mobile Computing Conference (IWCMC).
[2] Youssef, E.-N. S.; Labeau, F., False Data Injection Attacks Against State Estimation in Smart Grids: Challenges and Opportunities, 2018 IEEE Canadian Conference on Electrical & Computer Engineering (CCECE) (2018), p. 1-5.
[3] Esmalifalak, M.; Lanchao Liu; Nam Nguyen; Rong Zheng; Zhu Han, Detecting Stealthy False Data Injection Using Machine Learning in Smart Grid, IEEE Systems Journal (2017) vol. 11 Issue 3 p. 1644-1652.
[4] Deng, R.; Zhuang, P.; Liang, H., False Data Injection Attacks Against State Estimation in Power Distribution Systems, IEEE Transactions on Smart Grid vol. PP Issue 99 p. 1-1.I
[5] Qinxue Li; Delong Cui; Mei Liu, Data-Driven False Data Injection Attacks on State Estimation in Smart Grid, 2018 37th Chinese Control Conference (CCC)(2018) p. 6190-6195.
[6] Xuan Liu; Zuyi Li, Local Topology Attacks in Smart Grids, IEEE Transactions on Smart Grid (2017) vol. 8 Issue 6 p. 2617-2626.
[7] Jinsub Kim; Lang Tong, On Topology Attack of a Smart Grid: Undetectable Attacks and Countermeasures IEEE Journal on Selected Areas in Communications (2013) vol. 31 Issue 7 p. 1294-1305.

BRIEF SUMMARY OF THE INVENTION

The object of the invention is therefore to indicate a method for operating technical or non-technical systems in which any data attack on the system can be highly reliably detected.

This object is achieved according to the invention by a method with the features as claimed in the independent patent claim. Advantageous designs of the method according to the invention are indicated in subclaims.

It is thus provided according to the invention that the aforementioned second facility (which receives information of a first type) uses at least one information element of a second type which originates neither from the first facility nor from a different facility of the system, i.e. it comes from a source other than the system, to estimate the system state, checks, on the basis of the estimated system state, whether the received information matches the estimated system state to a predefined extent, and, in the event of a match to the predefined extent, regards the information as trusted, and otherwise generates a warning signal indicating a possible data attack.

A significant advantage of the method according to the invention is that facilities which receive the information of a first type can perform a system estimation in the method according to the invention on the basis of information of a second type, thus enabling a verification of the received information of a first type. If the check reveals a divergence beyond a predefined extent, a data attack can be inferred and a corresponding warning signal can be generated. The inventive concept, described by way of illustration, is therefore based on a digital "twin" for estimating the system state which runs in parallel with the system to be protected, independently estimates the measured values to be supplied by the process and uses data sources which do not themselves come from the process.

It is particularly advantageous if the system contains a multiplicity of first facilities and the second facility determines an actual system state on the basis of the information of a first type which it receives from the multiplicity of first facilities, compares the actual system state with the estimated system state and, if the two system states match one another to the predefined extent, regards the information as trusted, and otherwise generates the warning signal.

Information of the second type is preferably exogenous in relation to the system, i.e. information not native to the system and not collected from or in the system.

It is advantageous if the information of a first type contains at least one measured value which has been measured by a measuring device or a measuring facility of the system.

The second facility preferably forms a component of the technical system, in particular a control center.

The information of a first type preferably contains at least one measured value which the second facility uses to control and/or monitor the system.

Alternatively, it can be provided that the second facility is a field device, for example is or has an adjustment facility, and the information of a first type contain at least one adjustment command which the second facility is intended to execute.

The second facility performs the estimation of the system state preferably on the basis of the at least one information element of a second type and a trained artificial intelligence system which has been trained on the basis of different system states and matching information regarded as trusted.

Alternatively or additionally, it can be provided that the second facility performs the estimation of the system state on the basis of the at least one information element of a second type and a permanently programmed system description model.

It is particularly advantageously provided that at least one information element of a first type is transmitted from the second facility to the first facility and/or to at least one further facility, and the first or the at least one further facility uses information of a second type to estimate the system state, checks, on the basis of the estimated system state, whether the received information matches the estimated system state to a predefined extent, and, in the event of a match to the predefined extent, regards the information as trusted, and otherwise generates a warning signal indicating a data attack. In this design, the data transmission between the first and second facility can therefore be bidirectional.

The information of a first type which the first facility transmits to the second facility, preferably contains at least one measured value which has been measured by a measuring device (measuring facility) of the system, and the information of a first type which the second facility transmits to the first and/or the at least one further facility preferably contains at least one adjustment command which the first or the at least one further facility is intended to execute. In the case of a switch, the adjustment command may, for example, be a switching command and, in the case of a measuring instrument, it may, for example, be a conversion command to convert a measurement range or to convert a measurement quantity to be measured (current, voltage).

The first, second and/or further facility/facilities perform the estimation of the system state preferably on the basis of a trained artificial intelligence system which has been trained on the basis of different system states and matching information regarded as trusted. Alternatively or additionally, it can be provided that the facilities perform the estimation of the system state on the basis of a permanently programmed system description model.

The system preferably contains a training facility which performs the training of artificial intelligence systems, whether it be for one of the facilities, a plurality of the facilities or all facilities of the system which receive the information of a first type from a different facility of the system.

The training facility is preferably implemented in the second facility or in one of the second facilities. The training facility is particularly preferably implemented in a control center of the system.

The system is preferably an energy distribution or energy supply system. The first, second and remaining facilities preferably form components of the energy distribution or energy supply system.

The invention additionally relates to a facility for a technical or non-technical system, wherein the facility is suitable for receiving information of a first type which relates to the system and depends on the respective system state of the system.

It is provided according to the invention that the facility is configured to use at least one information element of a second type which originates from a source other than the system to check, on the basis of the estimated system state, whether the received information matches the estimated system state to a predefined extent, and, in the event of a match to the predefined extent, to regard the information as trusted, and otherwise to generate a warning signal indicating a possible data attack.

With regard to the advantages of the facility according to the invention and with regard to advantageous designs of the facility according to the invention, reference is made to the descriptions given above in connection with the method according to the invention.

Other features which are considered as characteristic for the invention are set forth in the appended claims.

Although the invention is illustrated and described herein as embodied in a method for operating a technical or non-technical system, and a facility for such systems, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL
VIEWS OF THE DRAWING

Figure 2:
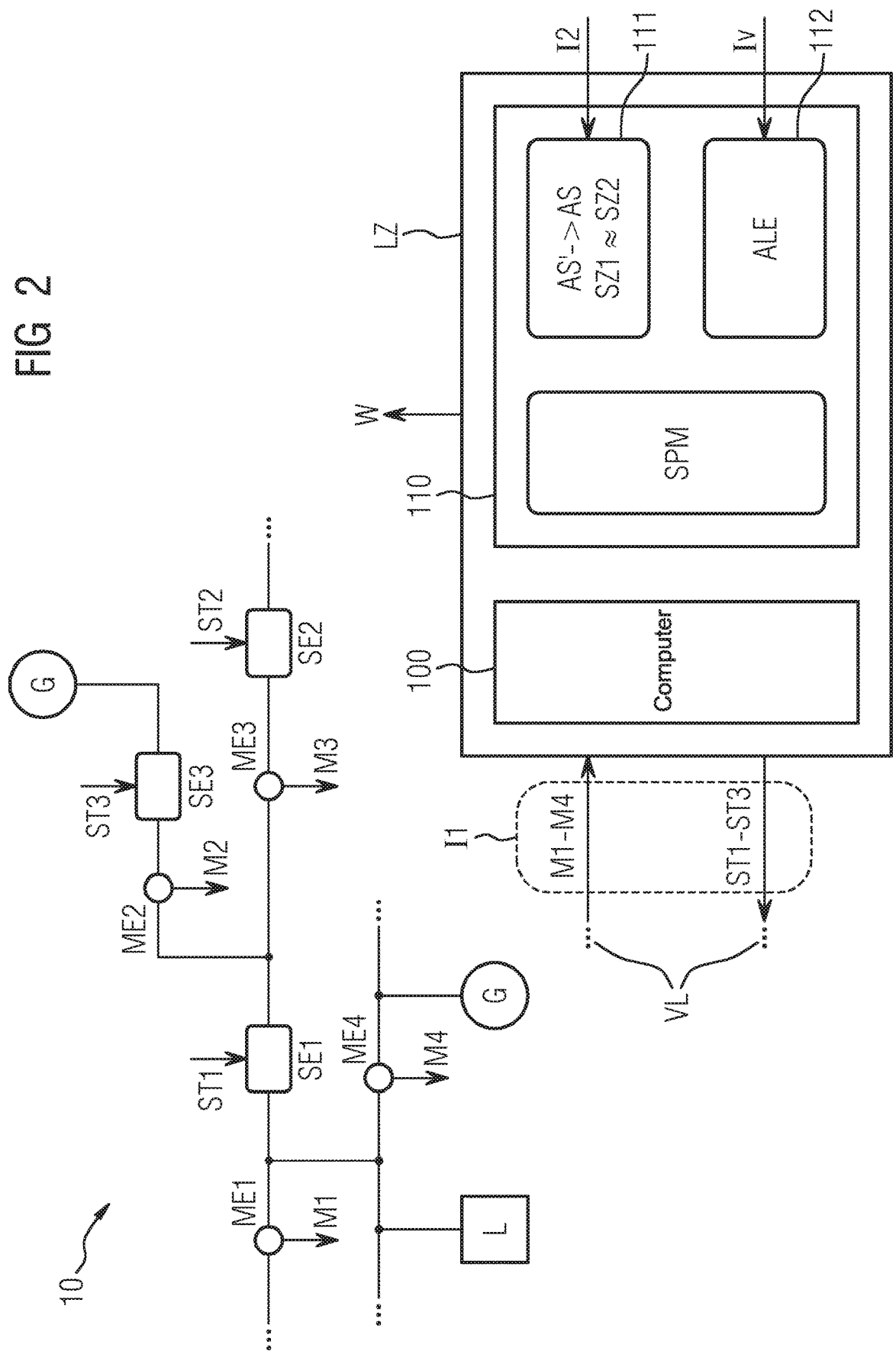
Figure 3:
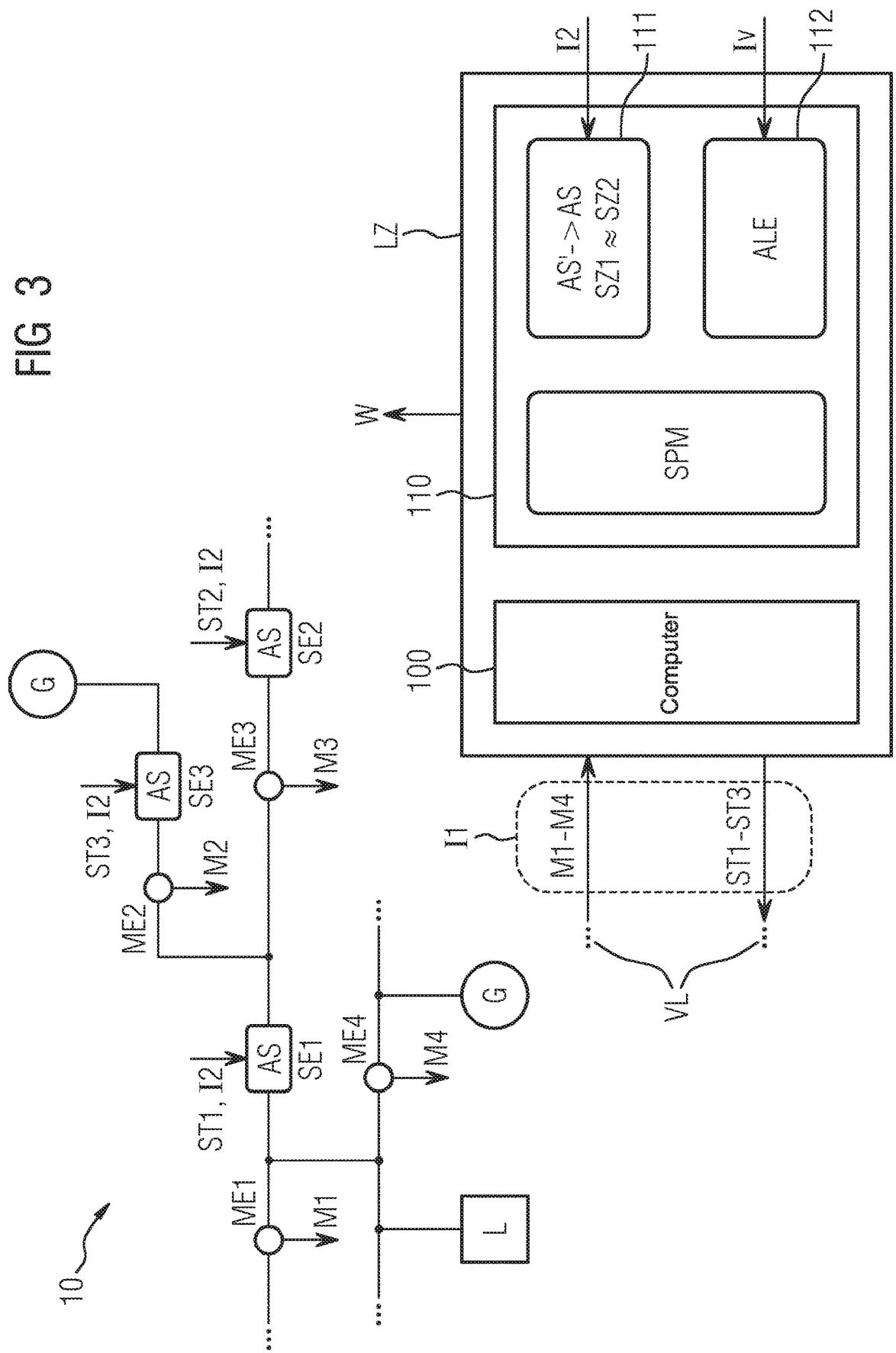

FIG. 1 is an illustration showing an example embodiment of a technical system in which a control center is equipped with a trained artificial intelligence system, wherein an example embodiment of a method according to the invention is explained on the basis of the technical system;

FIG. 2 is an illustration showing an example embodiment of the technical system in which the control center is equipped with a training facility to train the artificial intelligence system which is to be trained, wherein a further example embodiment of a method according to the invention is described on the basis of the technical system; and FIG. 3 is an illustration of an example embodiment of a system in which field devices are also equipped with trained artificial intelligence systems in order to verify adjustment commands of a control center.

DETAILED DESCRIPTION OF THE INVENTION

For the sake of clarity, the same reference numbers are always used in the figures for identical or comparable components.

Referring now to the figures of the drawings in detail and first, particularly to FIG. 1 thereof, there is shown an example embodiment of a system 10 which is formed by a network section of an electrical energy distribution or energy supply system or energy distribution or energy supply network. The system 10 has, inter alia, generators G which feed in electrical energy and electrical loads L which draw or consume electrical energy.

The system 10 is equipped with a multiplicity of first facilities which, in the example embodiment according to FIG. 1, are formed by field devices in the form of measuring instruments ME1, ME2, ME3 and ME4. The measuring instruments ME1 to ME4 generate measured values M1 to M4 which are transmitted as information I1 of a first type to a second facility via connection lines VL (not shown in detail for the sake of clarity). In the example embodiment according to FIG. 1, the second facility is formed by a control center LZ. The measured values M1 to M4 are preferably current values, voltage values, phase values, power values or other electrical measured values.

The system 10 according to FIG. 1 additionally has a multiplicity of further facilities which, in the example embodiment according to FIG. 1, are formed by field devices in the form of adjustment facilities SE1 to SE3 (e.g. switches). The adjustment facilities SE1 to SE3 receive adjustment commands ST1 to ST3 which are generated by the control center LZ and are transmitted via connection lines VL (not shown in detail for the sake of clarity) to the adjustment facilities SE1 to SE3. The adjustment commands ST1 to ST3 similarly represent information I1 of a first type.

The control center LZ contains a computing facility 100 and a memory 110. A program module 111 which forms a trained artificial intelligence system AS when executed by the computing facility 100 is stored in the memory 110. The trained artificial intelligence system AS is trained on the basis of information regarded as trusted.

The system 10 is preferably operated as now described.

The measured values M1 to M4 are transmitted as information I1 of a first type from the measuring facilities ME1 to ME4 to the control center LZ. On the basis of the measured values M1 to M4, i.e. the information of a first type, the control center LZ determines a system state based on the measured values, i.e. a measured system state, which can also be referred to as the actual system state SZ1 due to its relation to the native measured values of the system 10, since it would correspond to the actual system state, provided the measured values M1 to M4 are transmitted unfalsified or unmanipulated to the control center LZ.

In addition, the trained system AS determines an estimated system state SZ2 on the basis of information I2 of a second type which originates neither from the first facilities (in FIG. 1, the measuring facilities ME1 to ME4) nor from the other facilities (in FIG. 1, the adjustment facilities SE1 to SE3), i.e. it comes from a source other than the system 10. The information I2 of a second type can be referred to as exogenous data or information since it is not native to the system and has not been collected from or in the system 10. The information I2 of a second type may, for example, be weather data, calendar data (calendar day, time of day, time of year, etc.), current electricity prices, electricity price forecasts, or other external data or forecast data.

The estimation is performed on the basis of trained artificial intelligence which is implemented in the trained system AS.

The control center LZ, in particular the trained system AS, compares the actual system state SZ1 with the estimated system state SZ2. If the two system states SZ1 and SZ2 are sufficiently similar or match one another to a predefined extent, the trained system AS or the control center LZ infers from this that the received information I1 of a first type, here the measured values M1 to M4, is trusted and is allowed to be processed. If not, i.e. if the two system states SZ1 and SZ2 differ from one another beyond a predefined extent, the control center LZ or its trained system AS instead generates a warning signal W with which a possible data attack on the system 10 is indicated.

Adjustment commands ST1 to ST3 are generated and output as information of a first type to the adjustment facilities SE1 to SE3 on the basis of the measured values M1-M4 by means of a control program module SPM, but preferably only if no warning signal W is generated or if the system states SZ1 and SZ2 are identical or at least sufficiently similar.

FIG. 2 shows a second example embodiment of a system 10 in which a control center LZ is equipped with a trained artificial intelligence system AS.

In contrast to the example embodiment according to FIG. 1, a further software module 112 which forms a training facility ALE when executed by the computing facility 100 is stored in the memory 110. The training facility ALE serves to form the trained system AS or to train the control center LZ as a whole so that the control center LZ can form the estimated system state SZ2, as explained above in connection with FIG. 1.

In order to train a system AS' which is not yet trained or is not yet fully trained, i.e. is still to be trained, the learning facility ALE uses information Iv which is regarded as trusted and which was determined by means of the system 10 according to FIG. 2 or an identical or comparable other system through measurement and/or simulation and can be regarded as trusted and/or has been checked in terms of its trustworthiness.

After the training facility ALE has trained the system AS' which is to be trained and has formed the trained system AS, the latter can operate on the basis of the information I1 of a first type and the information I2 of a second type and can evaluate the measured values M1 to M4 and generate the adjustment commands ST1 to ST3, as explained above in connection with FIG. 1.

FIG. 3 shows a system 10 in which the control center LZ is equipped with a system AS' which is to be trained or an already trained system AS and also a training facility ALE. In this respect, the above descriptions in connection with FIG. 2 apply accordingly.

In contrast to the example embodiment according to FIG. 2, the field devices receiving the information of a first type (in FIG. 1 the adjustment facilities SE1 to SE3) are additionally equipped, in the example embodiment according to FIG. 3, with trained artificial intelligence systems AS which enable a verification of the adjustment commands ST1 to ST3 on the part of the field device.

Specifically, the adjustment facilities SE1 to SE3 can in each case estimate the respective system state using their trained systems AS and the aforementioned and/or other information I2 of a second type while forming an estimated system state SZ2, and can check on the basis of the estimated system state SZ2 whether the received information I1 of a first type (in FIG. 3 the respectively received adjustment commands ST1 to ST3) matches the estimated system state to a predefined extent. If so, the received information or the received adjustment command ST1 to ST3 is regarded as trusted and is executed; otherwise, a warning signal W indicating a possible data attack is generated.

In the example embodiment according to FIG. 3, the trained systems AS are trained or formed for the adjustment facilities SE1 to SE3 preferably by means of the training facility ALE of the control center LZ. The training facility ALE therefore serves not only to train the system AS' which is to be trained in the software module 111 in order to form the trained system AS, but additionally to train systems of the adjustment facilities SE1 to SE3 which are to be trained in order to make artificial intelligence available in these trained systems AS also. The trained system AS can be transmitted via the connection lines VL.

The design variant according to FIG. 3 offers the advantage that no other or no further training facilities need to be provided for the field devices, since the training is performed centrally by the control center LZ. Alternatively, but less advantageously, individual training facilities can also be provided for and/or in the field devices.

In connection with FIGS. 1 to 3, the adjustment facilities SE1 to SE3 are designated as further facilities, since they receive information of a first type from the control center LZ designated as the second facility. With a view to the data transmission between the control center LZ and the adjustment facilities SE1 to SE3, the control center LZ operating as a data transmitter could also be regarded and designated instead as the first facility and the adjustment facilities SE1 to SE3 operating as data receivers as the second facilities, since the latter perform the verification of the system state on the basis of information of a second type.

The above descriptions in connection with FIGS. 1 to 3 relate by way of example to a technical system in the form of a network section of an electrical energy distribution or energy supply system. The above descriptions are applicable in a corresponding manner to other technical or non-technical systems in which information of a first type relating to the system and depending on the respective system state of the system is transmitted from a transmitting (first) facility to a receiving (second) facility, and the receiving (second) facility performs the verification of the system state on the basis of information of a second type.

In connection with FIGS. 1 to 3, an estimation of the system state SZ2 is explained on the basis of artificial intelligence systems; alternatively or additionally, the estimation of the system state, i.e. the formation of the estimated system state SZ2, can be performed on the basis of a permanently programmed system description model.

In the example embodiments according to FIGS. 1 to 3, data are transmitted from the measuring facilities ME1 to ME4 to the control center LZ; in addition, information of a first type can also be transmitted from the control center LZ (facility of a second type) to the measuring facilities (i.e. facilities of a first type); in the latter case, it is advantageous if the measuring facilities, as facilities of a first type, perform a data verification by means of an estimation of the respective system state on the basis of information of a second type, as explained above for the control center LZ and the adjustment facilities ST1 to ST3, in order to check the authenticity of the received information of a first type.

Although the invention has been illustrated and described in greater detail by means of preferred example embodiments, the invention is not limited by the disclosed examples and other variations may be derived therefrom by the person skilled in the art without departing the protective scope of the invention.

The following is a summary list of reference numerals and the corresponding structure used in the above description of the invention:

10 System
100 Computing facility
110 Memory
111 Program module
112 Further software module
ALE Training facility
AS Trained artificial intelligence system
AS' Artificial intelligence system to be trained
G Generator
L Electrical load
I1 Information of a first type
I2 Information of a second type
Iv Trusted information
LZ Control center (second facility)
M1 Measured value(s)
M2 Measured value(s)
M3 Measured value(s)
M4 Measured value(s)
ME1 Measuring facility (one of the first facilities)
ME2 Measuring facility (one of the first facilities)
ME3 Measuring facility (one of the first facilities)
ME4 Measuring facility (one of the first facilities)
SE1 Adjustment facility (one of the further facilities)
SE2 Adjustment facility (one of the further facilities)
SE3 Adjustment facility (one of the further facilities)
SPM Control program module
ST1 Adjustment command
ST2 Adjustment command
ST3 Adjustment command
SZ1 Actual system state
SZ2 Estimated system state
VL Connection lines
W Warning signal

The invention claimed is:

1. A method for operating an energy distribution or energy supply system, the method which comprises the steps of:
transmitting at least one first information element of a first type which relates to the system and is dependent on a respective system state of the system from at least one first facility, being a component of the energy distribution or energy supply system to at least one second facility, being a field device of the energy distribution or energy supply system and being configured to execute adjustment commands;
using, in the at least one second facility, at least one information element of a second type which originates neither from the at least one first facility nor from a different facility of the system, namely coming from a source other than the system, to estimate the respective system state, the at least one information element of the second type being selected from the group consisting of weather data, calendar data, current electricity prices, and electricity price forecasts;
checking, in the at least one second facility, on a basis of an estimated system state, whether the at least one first information element of the first type received matches the estimated system state to a predefined extent; and
regarding the at least one first information element of the first type as trusted in an event of a match to the predefined extent and executing an adjustment command contained in the first information element of the first type by an adjustment facility of the field device, otherwise generating a warning signal indicating a possible data attack in an event of no match;

transmitting at least one second information element of the first type from the at least one second facility to the at least one first facility and to at least one further facility, and wherein the first or the at least one further facility:

uses the at least one information element of the second type to estimate the respective system state;

checks, on a basis of the estimated system state, whether the at least one second information element of the first type received matches the estimated system state to the predefined extent; and in the event of a match to the predefined extent, regards the at least one first information element of the first type as trusted, and otherwise generates the warning signal indicating the possible data attack.

2. The method according to claim 1, wherein:

the at least one first facility is one of a plurality of first facilities; and the at least one second facility determines an actual system state on a basis of the at least one information element of the first type which it receives from the plurality of first facilities, compares the actual system state with the estimated system state and, if the actual and estimated system states match one another to the predefined extent, regards the at least one first information element of the first type received from the first facilities as trusted, and otherwise generates the warning signal.

3. The method according to claim 1, wherein the at least one information element of the first type contains at least one measured value which has been measured by the at least one first facility being a measuring facility of the system.

4. The method according to claim 1, wherein the at least one second facility forms a component of the technical system, and the at least one information element of the first type contains at least one measured value which the at least one second facility uses to control and/or monitor the system.

5. The method according to claim 1, wherein:

the at least one second facility is a field device of the technical system and has an adjustment facility; and the at least one information element of the first type contains at least one adjustment command which the at least one second facility is intended to execute.

6. The method according to claim 1, which further comprises performing, via the at least one second facility, an estimation of the respective system state on a basis of the at least one information element of the second type and a trained artificial intelligence system which has been trained on a basis of different system states and matching information regarded as trusted.

7. The method according to claim 1, wherein the at least one second facility performs an estimation of the respective system state on a basis of the at least one information element of the second type and a permanently programmed system description model.

8. The method according to claim 1, wherein:

the at least one information element of the first type which the first facility transmits to the at least one second facility contains at least one measured value which has been measured by the at least one first facility being a measuring facility of the system; and the at least one information element of the first type which the at least one second facility transmits to the first and/or to the at least one further facility contains at least one adjustment command which the first or the at least one further facility is intended to execute.

9. The method according to claim 1, wherein the first, the second and/or the at least one further facility perform an estimation of the respective system state on a basis of a trained artificial intelligence system which has been trained on a basis of different system states and matching information regarded as trusted.

10. The method according to claim 9, wherein the system contains a training facility which performs training of the artificial intelligence system, whether it be for one of the first and second facilities, a plurality of the facilities or all facilities of the system which receive the at least one information element of the first type from a different facility of the system.

11. The method according to claim 10, wherein the training facility is implemented in the at least one second facility.

12. The method according to claim 10, wherein the training facility is implemented in a control center of the system.

13. The method according to claim 4, wherein the at least one second facility forms a control center of the technical system.

14. An energy distribution or energy supply system, comprising:

a first facility configured for receiving information of a first type relating to the system and depending on a respective system state of the system;

said first facility being further configured:

to use information of a second type coming from a source other than the system to estimate the respective system state, the information of the second type being selected from the group consisting of weather data, calendar data, current electricity prices, and electricity price forecasts;

to check, on a basis of an estimated system state, whether the information of the first type matches the estimated system state to a predefined extent; and a second facility, being a field device with an adjustment facility, said second facility being configured to transmit different information of the first type to said first facility or to a further facility, and said first or said further facility being configured to take into consideration information of the second type for estimating the system state, and to check on the basis of the estimated system state whether or not the different information corresponds to a certain extent with the estimated system state;

in an event of a match to the predefined extent, to regard the information of the first type as trusted and if the information of the first type includes at least one adjustment command to be executed by the adjustment facility, to execute the adjustment command and otherwise to generate a warning signal indicating a possible data attack.

* * * * *